United States Patent
O'Sullivan

(10) Patent No.: US 7,561,755 B2
(45) Date of Patent: Jul. 14, 2009

(54) IMAGE DISTORTION FOR CONTENT SECURITY

(75) Inventor: Joseph K. O'Sullivan, San Francisco, CA (US)

(73) Assignee: Google Inc., Mountain View, CA (US)

( * ) Notice: Subject to any disclaimer, the term of this patent is extended or adjusted under 35 U.S.C. 154(b) by 756 days.

(21) Appl. No.: 10/948,734

(22) Filed: Sep. 22, 2004

(65) Prior Publication Data

US 2006/0061796 A1  Mar. 23, 2006

(51) Int. Cl.
*G06K 9/36* (2006.01)
*G06K 9/54* (2006.01)
*G06F 15/00* (2006.01)
*G06F 7/00* (2006.01)

(52) U.S. Cl. .................... 382/284; 358/1.14; 707/3; 382/305

(58) Field of Classification Search .......... 382/284, 382/173, 254, 305; 358/1.14, 3.26, 3.27; 345/629; 707/3
See application file for complete search history.

(56) References Cited

U.S. PATENT DOCUMENTS

| 5,881,287 A | 3/1999 | Mast |
| 5,893,101 A | 4/1999 | Balogh et al. |
| 5,960,448 A | 9/1999 | Reichek et al. |
| 6,799,302 B1 | 9/2004 | Sites |
| 6,883,138 B2 * | 4/2005 | Rosenholtz et al. ......... 715/526 |
| 7,015,910 B2 * | 3/2006 | Card et al. .................. 345/427 |
| 2002/0032863 A1 | 3/2002 | Ha |
| 2005/0004949 A1 * | 1/2005 | Trepess et al. ........... 707/104.1 |

FOREIGN PATENT DOCUMENTS

EP  1359758 A1  11/2003

OTHER PUBLICATIONS

Amazon.com, Inc., "Press Release: Amazon.Com Launches "Search Inside the Book" Enabling Customers to Discover Books by Searching and Previewing the Text Inside", Oct. 23, 2003, [online] [Retrieved on Jan. 4, 2005] Retrieved from the Internet<URL:http://phx.corporate-ir.net/phoenix.zhtml?c=9766&p=IROL-NewsText&t=Regular&id=462057&>.

Amazon.com, Inc., "Search Inside the Book: FAQ", 2004 [online] [Retrieved on Jan. 4, 2005] Retrieved from the Internet <URL: http://www.amazon.com/exec/obidos/tg/browse/-/10197041/qid%3D1103344905/sr%3D1-1/002-9086708-9426431>.

(Continued)

*Primary Examiner*—Kanji Patel
(74) *Attorney, Agent, or Firm*—Fenwick & West LLP

(57) ABSTRACT

A software module is presented that enables a person to determine the relevance of an electronic document while preventing the person from making a complete copy of the document. In one embodiment, this is accomplished by displaying an image that represents a region of interest and conveys the context of the region of interest within the document while distorting other portions of the document. In one embodiment, the software module is used in conjunction with a search engine to generate an image of a search result document.

56 Claims, 9 Drawing Sheets

OTHER PUBLICATIONS

Amazon.com, Inc., "Search Inside the Book: How It Works", 2004 [online] [Retrieved on Jan. 4, 2005] Retrieved from the Internet <URL: http://www.amazon.com/exec/obidos/tg/browse/-/10197021/002-9086708-9426431>.

U.S. Appl. No. 10/953,496, filed Sep. 30, 2004, O'Sullivan, Joseph et al.

U.S. Appl. No. 10/956/564, filed Oct. 1, 2004, Whitten, Alma et al.

PCT International Search Report and Written Opinion; PCT/US2005/034141, Jan. 9, 2006.

European Application No. EP05798318.1 Examination Report, Jul. 26, 2007.

Office Action Of China State Intellectual Property Office, Chinese Application No. 200580037231.9, Apr. 7, 2008.

Examination Report, European Patent Application No. 05798318.1, Mar. 28, 2008.

\* cited by examiner

Chapter Sample

This is sample text. This is sample text. This is sample text. This is sample text. This is sample text. This is sample text.

This is sample text. This is sample text. This is sample text. This is sample text. This is sample text. This is sample text. This is sample text. This is sample text. This is sample text. This is sample text.

This is sample text. This is sample text. This is sample text. This is sample text. This is sample text. This is sample text. Keyword. This is sample text. This is sample text. This is sample text. This is sample text. This is sample text. This is sample text.

Chapter Sample

This is sample text. This is sample text. This is sample text. This is sample text. This is sample text. This is sample text. This is sample text.

This is sample text. This is sample text. This is sample text. This is sample text. This is sample text. This is sample text. This is sample text. This is sample text. This is sample text.

This is sample text. This is sample text. This is sample text. This is sample text. This is sample text. This is sample text. This is sample text. This is sample text. This is sample text. This is sample text.

This is sample text. This is sample text. Keyword. This is sample text. This is sample text.

Chapter Sample

This is sample text. This is sample text. This is sample text. This is sample text. This is sample text. This is sample text. This is sample text.

This is sample text. This is sample text. This is sample text. This is sample text. This is sample text. This is sample text. This is sample text. This is sample text. This is sample text. This is sample text.

This is sample text. This is sample text. This is sample text. This is sample text. This is sample text. This is sample text. Keyword. This is sample text. This is sample text. This is sample text. This is sample text. This is sample text. This is sample text.

IMAGE DISTORTION FOR CONTENT SECURITY

BACKGROUND OF THE INVENTION

1. Field of the Invention

The present invention relates to document security and, more particularly, to preventing a user from obtaining a complete copy of a document.

2. Description of the Background Art

It is easier to make a complete copy of information in electronic form than it is to make a complete copy of information in physical form. This fact makes content owners wary of making their electronic information accessible by the public. However, content owners desire to provide their content to users, often for a fee, and would benefit by having this information be searchable, in order to assist users in finding content that is relevant to their interests and needs. Users of search engines in particular expect to be able to view the relevant portions of a document or other content prior to purchasing the content. However, providing users access to the relevant portions typically results in giving users access to the entire document in a way that allows the user to make a complete copy of the content without paying for it.

Alternatively, it is possible to prohibit users' access to the relevant portions of a document until payment is received. However, in that situation, users are unable to see the relevant portions of the document and thus cannot best judge whether the document satisfies their interests or needs and, as a result, are less likely to purchase the content. Various other technologies have been developed with the goal of allowing a user to view a document while preventing the user from making a copy of it. These technologies include, for example, modifying the user's browser to disable printing and specifying that an image, if printed, should be blank. While many technologies exist, each of them can be circumvented.

What is needed is a way to allow a user to view an electronic document while preventing the user from making a copy of it.

SUMMARY OF THE INVENTION

A method for generating an image is presented, wherein the image displays a document, and the document is relevant to a search query. The method comprises generating a first image portion, the first image portion containing a region of interest, the region of interest being a portion of the document that is relevant to the search query; generating a second image portion, the second image portion comprising a second portion of the document that contains the region of interest, the second image portion being distorted; and generating an image comprising the first image portion and the second image portion.

BRIEF DESCRIPTION OF THE DRAWINGS

FIG. 1A illustrates an undistorted image of a document.

FIG. 2A illustrates an image of the same document as that shown in FIG. 1A, according to one embodiment of the invention.

FIG. 6A illustrates an image similar to the image shown in FIG. 2A where a search term is underlined, according to one embodiment of the invention.

FIG. 6B illustrates an image similar to the image shown in FIG. 2B where a search term is underlined, according to one embodiment of the invention.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Search engine results typically comprise a list of links to electronic documents that satisfy a search query. In this disclosure, a "document" is understood to include any textual, graphical, visual, multimedia, or other type of work for which a visual representation can be derived and presented to a user. In order to determine whether a particular electronic document is relevant to a user's interests or needs, the user views the document. This is generally performed by clicking on the link associated with the document, which causes the document to be displayed.

Although the entire document is usually displayed, a document's relevancy can frequently be determined based on a portion of the document that is relevant to the search terms (a "region of interest"). A ROI can be, for example, a word, a sentence, a paragraph, a table, a graphic, or any other textual, graphical, visual, multimedia, or video element or the like, depending on the type of content involved. While the user does not need to see the entire document in order to determine whether it is relevant, it is useful to know the context of the ROI within the document.

One embodiment of the invention enables a person to determine the relevance of an electronic document while preventing the person from making a complete copy of the document. In one embodiment, this is accomplished by displaying an image that represents a ROI and conveys the context of the ROI within the document while distorting other portions of the document.

FIG. 1A illustrates an undistorted image of a document. Image 100A is a single page of a lengthy document, and is exemplary of images shown by conventional imaging tools that are used to display electronic documents. If so inclined, a user can copy the entirety of the text (or image) portions shown and use these copied portions without permission from, or payment to, the owner of the document. Image 100A is derived from a document that can be in, for example, text format, image format, a markup language, a page description language, or other format.

Figure 1B:
FIG. 1B illustrates a distorted image of the same document as that shown in FIG. 1A, according to one embodiment of the invention.

FIG. 1B illustrates a distorted image of the same document as that shown in FIG. 1A, according to one embodiment of the invention. Image 100B may be created directly from the underlying document, or it may be created from an undistorted image of the underlying document, such as image 100A. Using the second option, image 100B is created by distorting the undistorted image 100A. While there are many ways to distort an image, in one embodiment, the image 100A is distorted by using pixelation and also by decreasing the brightness level of portions of the image that are outside of a region of interest of the user.

Figure 2B:
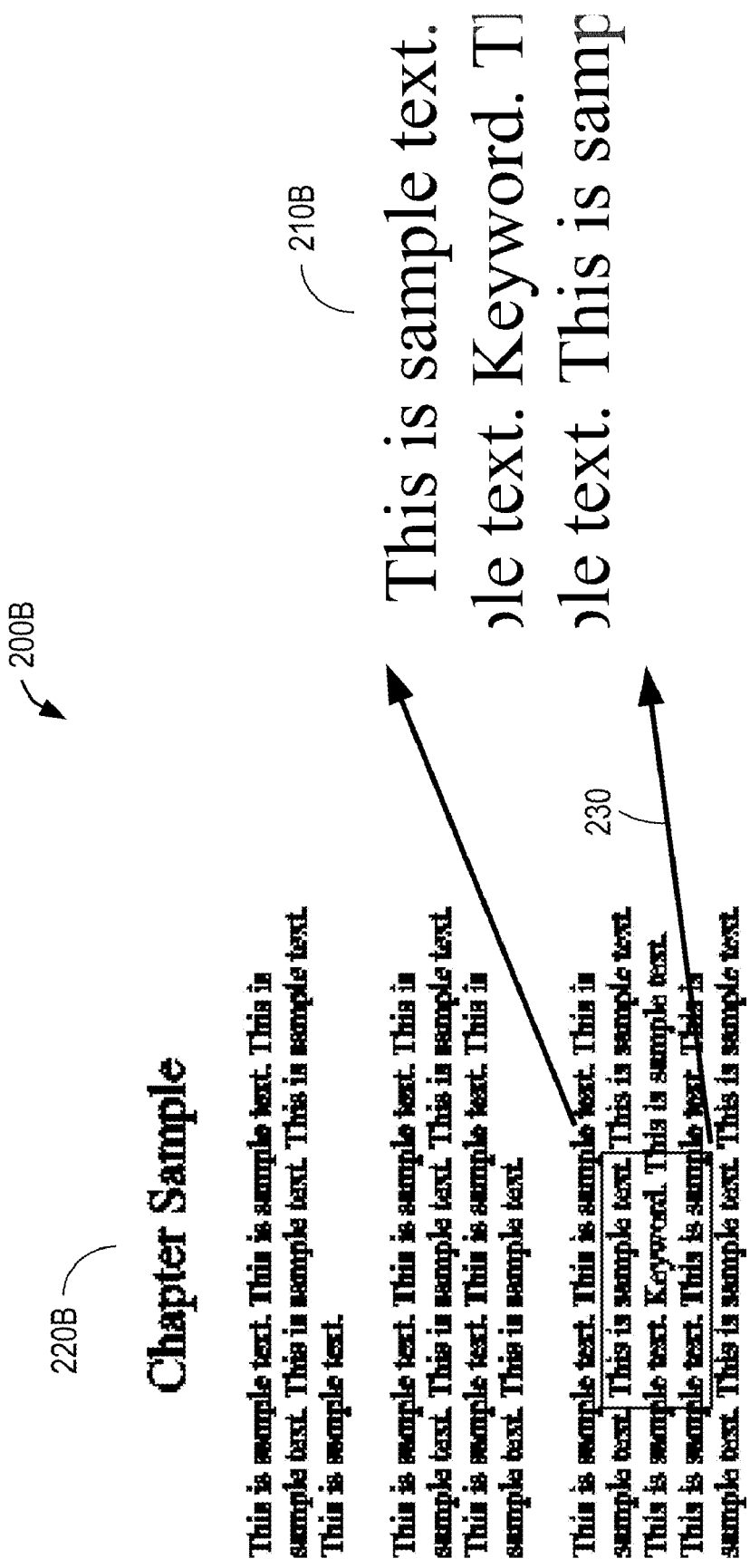
FIG. 2B illustrates an image of the same document as that shown in FIG. 1A, according to another embodiment of the invention.

In one embodiment, the user is not shown a complete, undistorted image of the document and thus is prevented from making a copy of the undistorted document. However, the user is still able to determine the relevance of the document to the user's needs, and thus, for example, whether the user should purchase the document or not. FIG. 2A illustrates an image of the same document as that shown in FIG. 1A, according to one embodiment of the invention. FIG. 2B illustrates an image of the same document as that shown in FIG. 1A, according to another embodiment of the invention.

In one embodiment, an image 200 enables a user to determine the relevance of the underlying document by displaying an undistorted image portion 210 of a first portion of the document and a distorted image portion 220 of a second portion of the document. In one embodiment, the second portion of the document is one page of the document (for example, if the document is a multi-page document). In another embodiment, the second portion of the document is an area of the document (for example, if the document is graphical).

In the illustrated embodiments, image 200A comprises image portions 210A and 220A, and image 200B comprises image portions 210B and 220B. As illustrated in FIGS. 2A and 2B, the first portions 210A, 220B of the documents comprise three partial lines of text, with the first partial line being "This is sample text." The second portions 220A, 220B comprise the remaining contents of the page represented by image 200.

Figure 6B:
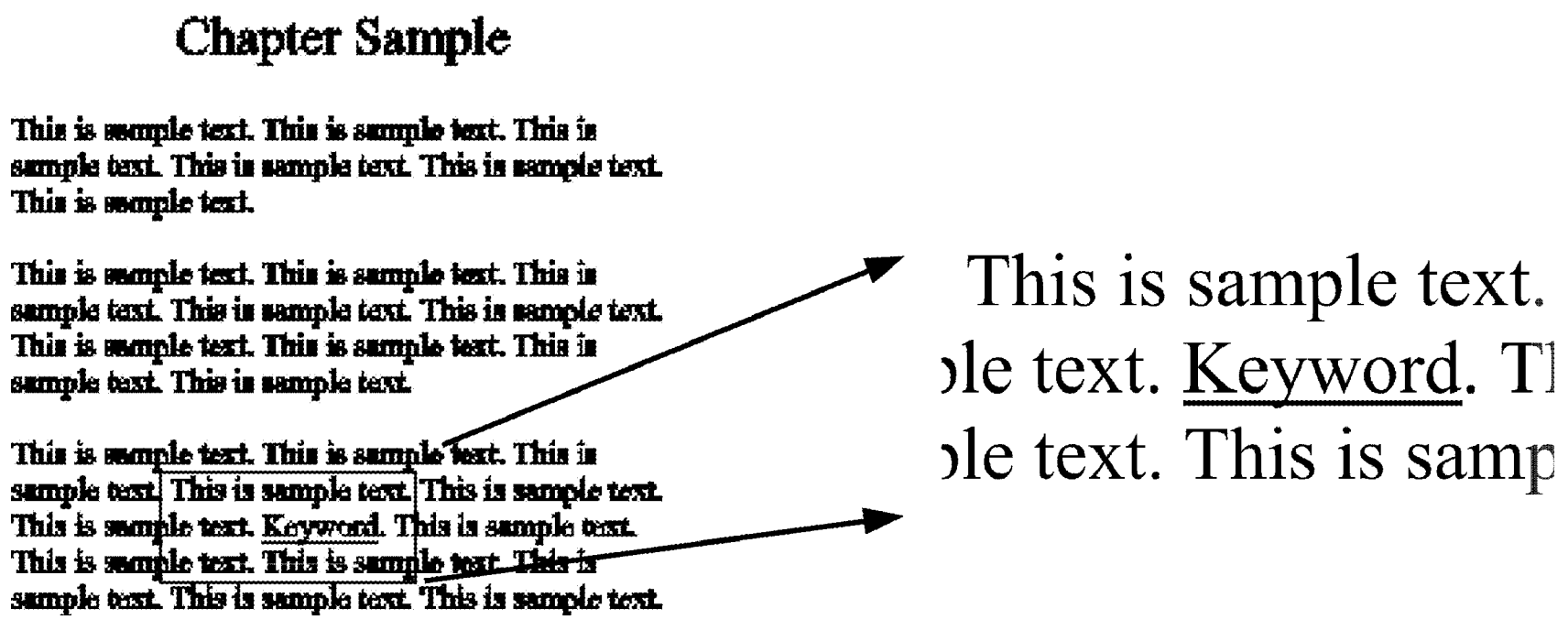

In a preferred embodiment, the first portion of the document is the user's ROI (i.e., a portion of the document that is relevant to the user's search terms). The contents of image portion 210, which displays the user's ROI, should be readable by a typical user so that the user can determine whether the ROI is relevant. In one embodiment, image portion 210 is undistorted, similar to image 100A. In another embodiment, image portion 210 is modified to help the user determine the relevance of the document. For example, image portion 210 may indicate the presence of search terms by displaying these terms with underlining, or outlining, or highlighting. FIG. 6A illustrates an image similar to the image shown in FIG. 2A where a search term is underlined, according to one embodiment of the invention. FIG. 6B illustrates an image similar to the image shown in FIG. 2B where a search term is underlined, according to one embodiment of the invention.

In a preferred embodiment, the second portion of the document is that which corresponds to the page that is represented by image 200. Image portion 220, which displays the second portion of the document, should be distorted so that its contents are unreadable by a typical user or otherwise degraded to devalue or impair a user's use or copying of them. For example, an image portion 220 can be pixilated, blurred, tinted, or converted to a lower resolution.

In one embodiment, the relative locations of undistorted image portion 210 and distorted image portion 220 within image 200 convey the context of the ROI within the page of the document that is being displayed. In FIG. 2A, for example, image 200A shows undistorted image portion 210A being located "on top of" distorted image portion 220A at a similar place to where the ROI would be located within the page of the document that is being displayed. In contrast, in FIG. 2B, image 200B shows undistorted image portion 210B being located next to distorted image portion 220B and also shows a "callout" 230 from distorted image portion 220B to undistorted image portion 210B.

Figure 3:
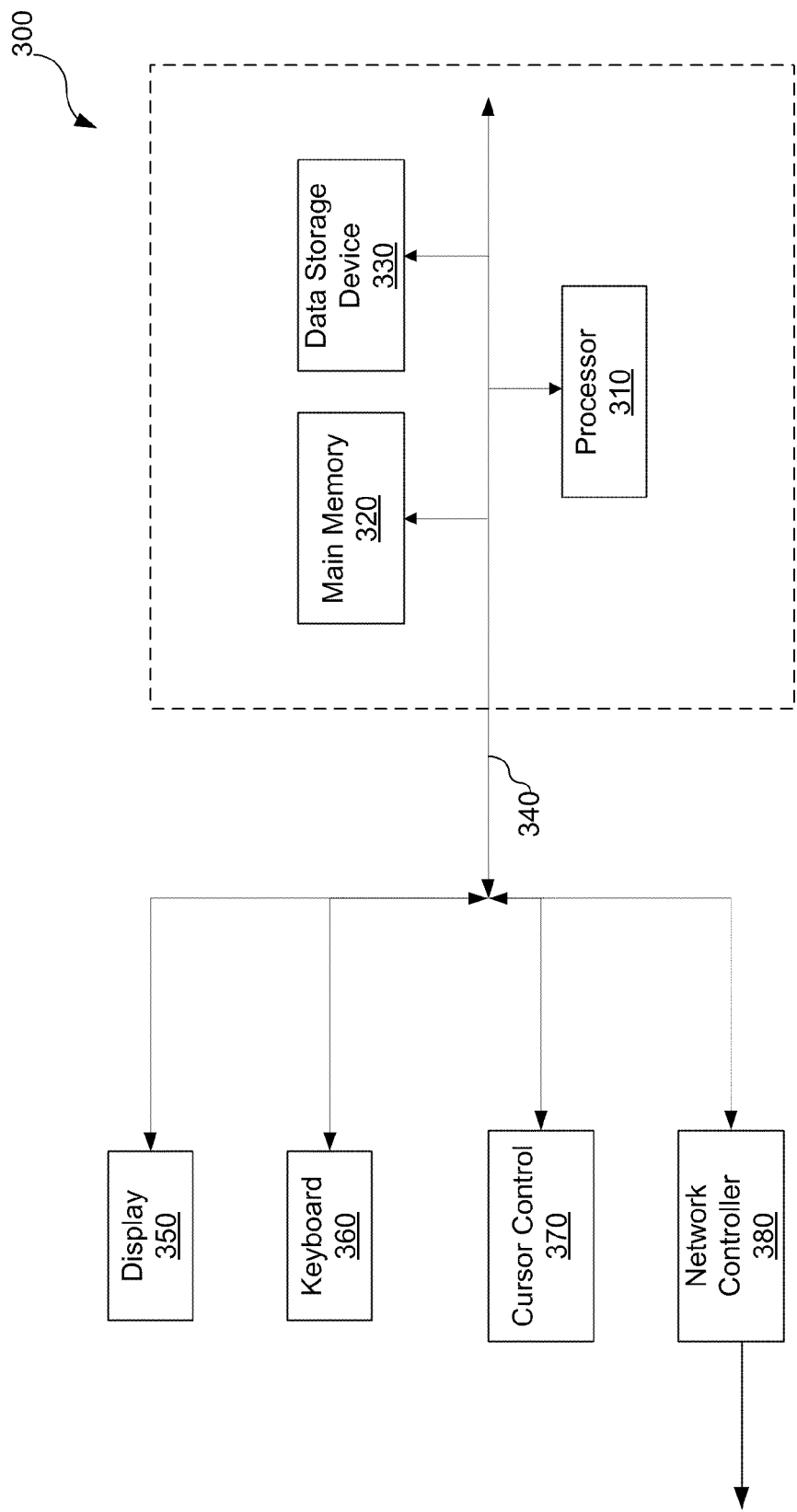
FIG. 3 illustrates a block diagram of a general-purpose computing device for implementing the invention according to one embodiment.

Embodiments of the invention will now be further described below with reference to FIGS. 3-5. FIG. 3 illustrates a block diagram of a general-purpose computing device for implementing the invention according to one embodiment. The computing device 300 preferably includes a processor 310, a main memory 320, a data storage device 330, and a network controller 380, all of which are communicatively coupled to a system bus 340. Computing device 300 may be, for example, a workstation, a desktop computer, a laptop computer, a tablet computer, a personal digital assistant (PDA), or any other type of computing device.

Processor 310 processes data signals and comprises various computing architectures including a complex instruction set computer (CISC) architecture, a reduced instruction set computer (RISC) architecture, or an architecture implementing a combination of instruction sets. Although only a single processor is shown in FIG. 3, multiple processors may be included.

Main memory 320 stores instructions and/or data that are executed by processor 310. The instructions and/or data comprise code for performing any and/or all of the techniques described herein. Main memory 320 is preferably a dynamic random access memory (DRAM) device, a static random access memory (SRAM) device, or some other memory device known in the art.

Data storage device 330 stores data and instructions for processor 310 and comprises one or more devices including a hard disk drive, a floppy disk drive, a CD-ROM device, a DVD-ROM device, a DVD-RAM device, a DVD-RW device, a flash memory device, or some other mass storage device known in the art.

Network controller 380 links the computing device 300 to a network (not shown).

System bus 340 represents a shared bus for communicating information and data throughout the computing device 300. System bus 340 represents one or more buses including an industry standard architecture (ISA) bus, a peripheral component interconnect (PCI) bus, a universal serial bus (USB), or some other bus known in the art to provide similar functionality.

Additional components that may be coupled to the computing device 300 through system bus 340 include a display device 350, a keyboard 360, and a cursor control device 370. Display device 350 represents any device equipped to display electronic images and data to a local user or maintainer. Display device 350 is a cathode ray tube (CRT), a liquid crystal display (LCD), or any other similarly equipped display device, screen, or monitor. Keyboard 360 represents an alphanumeric input device coupled to computing device 300 to communicate information and command selections to processor 310. Cursor control device 370 represents a user input device equipped to communicate positional data as well as command selections to processor 310. Cursor control device 370 includes a mouse, a trackball, a stylus, a pen, cursor direction keys, or other mechanisms to cause movement of a cursor.

It should be apparent to one skilled in the art that computing device 300 includes more or fewer components than those shown in FIG. 3 without departing from the spirit and scope of the present invention. For example, computing device 300 may include additional memory, such as, for example, a first or second level cache or one or more application specific integrated circuits (ASICs). As noted above, computing device 300 may be comprised solely of ASICs. In addition, components may be coupled computing device 300 including, for example, image scanning devices, digital still or video cameras, or other devices that may or may not be equipped to capture and/or download electronic data to/from computing device 300.

Figure 4:
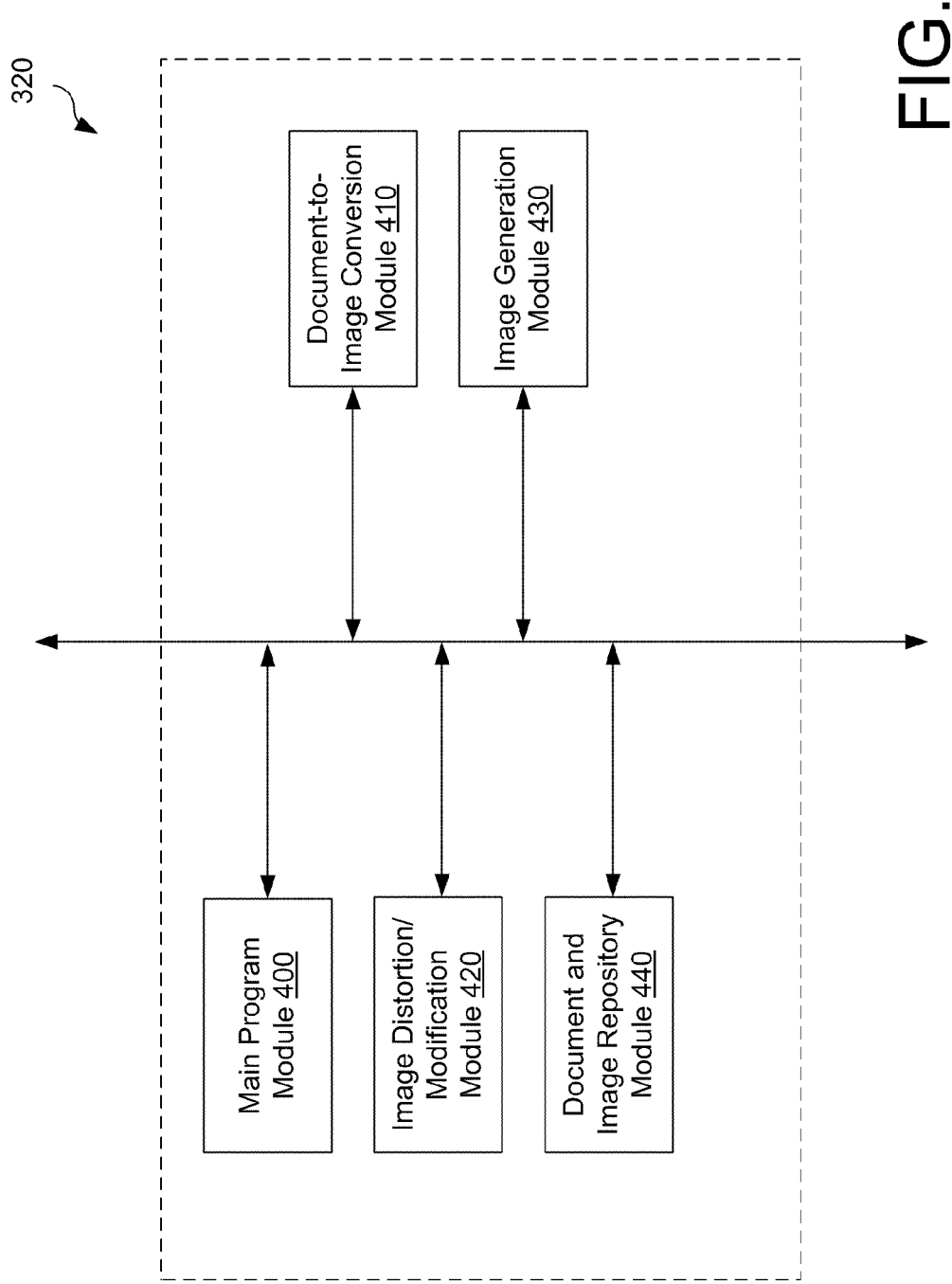
FIG. 4 illustrates a block diagram of a software architecture for a system according to one embodiment of the invention.

FIG. 4 illustrates a block diagram of a software architecture for a system according to one embodiment of the invention. Generally, several code modules and memory storage areas are stored in the memory 320 for generating an image that represents a portion of a document and conveys the context of that portion within the document. Specifically, the code modules and memory storage areas include a main program module 400, a document-to-image conversion module 410, an image distortion/modification module 420, an image generation module 430, and a document and image repository module 440. Code modules 400, 410, 420, and 430 and memory storage area 440 are communicatively coupled to each other.

Main program module 400 transmits instructions and data to as well as receives data from each code module and memory.

Document-to-image conversion module 410 generates, given an electronic document, an image of at least one page of that document. In a typical embodiment, document-to-image conversion module 410 generates a separate image for each page of the document that contains one or more of the search terms (or conceptually related terms) of the user's query.

In one embodiment, document-to-image conversion module 410 generates undistorted image 100A. Undistorted image 100A may be cropped to display only the user's ROI and then used as undistorted image portion 210. Alternatively, undistorted image 100A may be distorted using image distortion/modification module 420 and then used as distorted image portion 220. In one embodiment, after document-to-image conversion module 410 has generated undistorted image 100A, undistorted image 100A is stored using document and image repository module 440 so that undistorted image 100A does not have to be generated again.

In an alternative embodiment, document-to-image conversion module 410 generates distorted image 100B. Distorted image 100B may be used as distorted image portion 220. In one embodiment, after document-to-image conversion module 410 has generated distorted image 100B, distorted image 100B is stored using document and image repository module 440 so that distorted image 100B does not have to be generated again. Many distortion methods may be used. These methods include, for example, pixelation, change of brightness, change of contrast, blurring, and image filtering. Document-to-image conversion module 410 may use one or more of these methods to generate distorted image 100B.

Document-to-image conversion module 410 may also generate an image that has been modified based on the user's search terms (e.g., by highlighting the search terms within the image). This modified image could be either undistorted or distorted. If the modified image is undistorted, it could be cropped to display only the user's ROI and then used as undistorted image portion 210. If the modified image is distorted, it could be used as distorted image portion 220. In one embodiment, a modified image would not be saved because its use is limited to a query containing the same search terms.

Document-to-image conversion module 410 can generate an image in several ways. If the electronic version of the original document is a PDF document, for example, document-to-image conversion module 410 can use the capabilities of PDF software to output the document's contents as an image. If it is a word processing file, document-to-image conversion module 410 can print the document's contents to a file (rather than to a printer) as an image. If it is an image (e.g., a physical document that has been scanned), document-to-image conversion module 410 can further process the image as necessary. For example, document-to-image conversion module 410 can divide the image into several parts and/or reduce the resolution of the image by downsampling. Another possibility is for document-to-image conversion module 410 to use a software conversion program that converts a specific type of electronic file to an image.

Image distortion/modification module 420 generates, given an image, a different version of that image. In one embodiment, image distortion/modification module 420 generates a distorted version of the image 100B. As discussed above with reference to document-to-image conversion module 410, distorted image 100B may then be stored and/or used as distorted image portion 220. Many distortion methods may be used. These methods include, for example, pixelation, change of brightness, change of contrast, blurring, and image filtering. Image distortion/modification module 420 may use one or more of these methods to generate distorted image 100B.

In another embodiment, image distortion/modification module 420 generates an image that has been modified based on the user's search terms (e.g., by highlighting the search terms within the image). This modified image could be either distorted or undistorted. As discussed above with reference to document-to-image conversion module 410, this modified image could be used as distorted image portion 220 or cropped and then used as undistorted image portion 210. In one embodiment, the modified image would not be saved.

Image generation module 430 generates an image 200 that 1) represents a portion of a document (such as a ROI) and 2) conveys the context of that portion within the document. In one embodiment, image 200 comprises image portions 210 and 220. Image portion 210 is used to represent the ROI, while image portions 210 and 220 are used to convey the context of the ROI by indicating the location of the ROI within the document.

Many types of images 200 can be used to indicate the context of the ROI. One simple example is shown in FIG. 2A. Image 200A is a composite image comprising image portions 210A and 220A such that the combination of image portions 210A and 220A appears to be a single document. In one embodiment, image portion 210A is overlaid on image portion 220A such that image portion 210A covers the portion of image portion 220A that contains the ROI.

In one embodiment, image portion 210A has a similar appearance to image portion 220A except that image portion 220A is distorted and image portion 210A is not. In another embodiment, image portion 210A has a different appearance from image portion 220A, besides the fact that image portion 220A is distorted and image portion 210A is not. This difference in appearance helps distinguish image portion 210A from the rest of image 200A and thereby makes it easier for the user to find image portion 210A within image 200A. For example, the font and/or background color of image portion 210A may differ from the font and/or background color of image portion 220A. Similarly, image portion 210A may be outlined, forming a bounding box (e.g., a rectangle) that extends a minimum distance (e.g., 0.5") outside of the contents of image portion 210A.

Another example of an image that can be used to indicate the context of the ROI is shown in FIG. 2B. Image 200B similarly comprises image portions 210B and 220B, but image 200B does not overlay image portion 210B onto image portion 220B. Instead, image 200B places image portion 210B outside of image 220B and uses a "callout" 230 from image portion 210B to the location of the ROI within distorted image 220B.

In one embodiment, image generation module 430 generates a location map of the displayed document page showing the location of the ROI. Image generation module 430 then uses this map to generate image 200 such that image 200 indicates the context of the ROI. In one embodiment, image generation module 430 determines the location of the ROI based on the locations of words within the ROI. The locations of these words are obtained by querying document and image repository module 440.

Document and image repository module 440 stores documents and/or images. These images may include, for example, undistorted images 100A of a document and distorted images 100B of a document. If a document exists in electronic format, the electronic format is stored in document and image repository module 450. If no electronic format exists, then the document is digitized by, for example, scanning the document and/or performing Optical Character Recognition (OCR) on it. The results are then stored in document and image repository module 450.

Document and image repository module 440 also stores positions of words within documents and/or images. For example, document and image repository module 440 stores, for each word in an image or document, the dimensions of the smallest box that can enclose the word (the word's "bounding box") and the location of the box in the image or document (e.g., in x,y coordinates). Given a file that contains text, determining a word's bounding box is known to those of ordinary skill in the art. In one embodiment, if the file is an image file, the image is converted to text by OCR'ing it. As a by-product of the OCR process, the dimensions and locations of bounding boxes can be determined.

User Scenario

Figure 5:
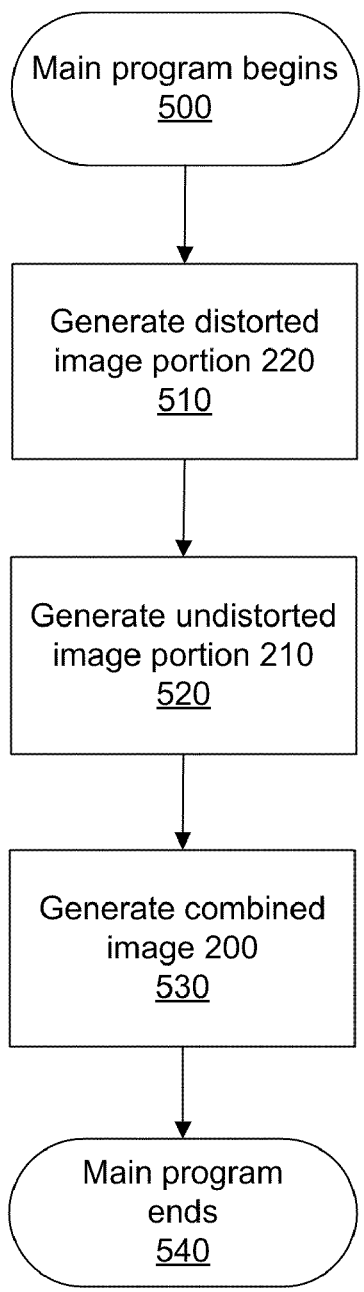
FIG. 5 illustrates a flowchart of a method performed by a main program, according to one embodiment of the invention.

FIG. 5 illustrates a flowchart of a method performed by a main program, according to one embodiment of the invention. This method may be used, for example, in conjunction with a search engine. Before the method of FIG. 5 begins, a user enters a query into a search engine. The query may contain various search terms and expressions.

The search engine then generates a set of results, typically a list of documents. Each result represents a reference to a document that is relevant to the query. A document can be relevant to a query because, for example, its contents directly "match" the query terms (e.g., using a textual match). Alternatively, a document can be relevant because its contents are conceptually, semantically, or topically related to the query terms. Similarly, a document can be relevant because meta-information associated with the document (e.g., the document's author or publication date) satisfy the query. The particular way in which the search engine determines relevant documents is not material to the invention, which may be used with any type of search engine.

When a user selects one of the search results (e.g., by clicking on a link of the document's name), the search engine determines a portion of the document that is relevant to the query (a ROI). The search engine also determines where query terms appear in the document, if at all. This process is known to those of ordinary skill in the art. Main program module 400 then begins 500.

Steps 510 and 520 may occur in any order, including simultaneously. Main program module 400 generates 510 distorted image portion 220. Distorted image portion 220 is, for example, a page of the selected document that contains the user's ROI. In one embodiment, distorted image portion 220 is not modified based on the user's query. In this embodiment, main program module 400 uses a distorted image of the selected page 100B as distorted image portion 220. There are several ways to obtain distorted image 100B. A few of these ways are described below.

In one embodiment, main program module 400 retrieves distorted image 100B from document and image repository module 440 if image 100B exists.

In another embodiment, if image 100B does not exist, main program module 400 retrieves an undistorted image of the selected page 100A from document and image repository module 440 if image 100A exists. If image 100A does exist, main program module 400 distorts image 100A using image distortion/modification module 420, thereby generating image 100B. In one embodiment, main program module 400 also stores image 100B in document and image repository module 440 for later use.

In yet another embodiment, if image 100A does not exist, main program module 400 retrieves the selected document from document and image repository module 440. Main program module 400 then generates an image from the document using document-to-image conversion module 410. In one embodiment, main program module 400 uses document-to-image conversion module 410 to generate distorted image 100B. In one embodiment, main program module 400 also stores image 100B in document and image repository module 440 for later use.

In another embodiment, main program module 400 uses document-to-image conversion module 410 to generate undistorted image 100A. In one embodiment, main program module 400 stores image 100A in document and image repository module 440 for later use. Main program module 400 then distorts image 100A using image distortion/modification module 420, thereby generating image 100B. In one embodiment, main program module 400 also stores image 100B in document and image repository module 440 for later use.

In another embodiment, distorted image portion 220 is modified based on the user's query. In this embodiment, main program module 400 obtains distorted image 100B as described above. Then, main program module 400 uses image distortion/modification module 420 to modify image 100B based on the user's query. This modified image is then used as distorted image portion 220.

Main program module 400 generates 520 undistorted image portion 210. Undistorted image portion 210 is, for example, the user's ROI. In one embodiment, undistorted image portion 210 is not modified based on the user's query. In this embodiment, main program module 400 obtains an undistorted image of the selected page 100A and then crops this image to show the user's ROI. The cropped image is then used as undistorted image portion 210. There are several ways to obtain undistorted image 100A. A few of these ways are described below.

In one embodiment, main program module 400 retrieves undistorted image 100A from document and image repository module 440 if image 100A exists.

In another embodiment, if image 100A does not exist, main program module 400 retrieves the selected document from document and image repository module 440. Main program module 400 then uses document-to-image conversion module 410 to generate, from the document, undistorted image 100A. In one embodiment, main program module 400 also stores image 100A in document and image repository module 440 for later use.

In another embodiment, undistorted image portion 210 is modified based on the user's query. In this embodiment, main program module 400 obtains undistorted image 100A as described above. Then, main program module 400 uses image distortion/modification module 420 to modify image 100A based on the user's query. This modified image is then cropped and used as undistorted image portion 210.

Finally, main program module 400 uses image generation module 430 to generate combined image 200 using undistorted image portion 210 and distorted image portion 220. Main program module 400 then ends 540, and combined image 200 is displayed to the user.

Additional Embodiments

In one embodiment, more than one computing device 300 is used, such as in a client-server setting. For example, a user may input a query into a search engine using a first computing device 300A (the "client"). The first computing device 300A will then use the network controller 380A to send the query to a second computing device 300B (the "server"). The second computing device 300B will perform the search and then send the search results to the first computing device 300A using the network controller 380B.

The user will then select a document to display, and the first computing device 300A will send the user's selection to either the second computing device 300B or a third computing device 300C (another "server").

In a preferred embodiment, second computing device 300B or third computing device 300C will then generate combined image 200 by performing the method of FIG. 5 and send combined image 200 to the first computing device 300A. First computing device 300A then displays combined image 200 to the user using display 350. In this embodiment, the first computing device 300A never contains a complete copy of either the underlying electronic document or an undistorted image of the underlying electronic document.

In an alternate embodiment, second computing device 300B or third computing device 300C sends to the first computing device 300A the requested electronic document, an undistorted image 100A of the electronic document, and/or a distorted image 100B of the electronic document. First computing device 300A then generates combined image 200 by performing the method of FIG. 5 and displays combined image 200 to the user using display 350.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatuses to perform the required method steps. The required structure for a variety of these systems appears from the description. In addition, the present invention is not described with reference to any particular programming language. It will be appreciated that a variety of programming languages may be used to implement the teachings of the invention as described herein.

The present invention provides various mechanisms for automatically presenting an analysis report for a prospective trade or other transaction, with a minimum of user effort. One skilled in the art will recognize that the particular examples described herein are merely illustrative of representative embodiments of the invention, and that other arrangements, methods, architectures, and configurations may be implemented without departing from the essential characteristics of the invention. Accordingly, the disclosure of the present invention is intended to be illustrative, but not limiting, of the scope of the invention, which is set forth in the following claims.

What is claimed is:

1. A computer-implemented method for generating an image of a document, the method comprising:
    determining a first image, the first image comprising a less distorted representation of a region of interest, the region of interest comprising a first portion of the document, the first portion being relevant to a search query;
    determining a second image, the second image comprising a more distorted representation of the document, the document comprising the first portion and a second portion that is not relevant to the search query; and responsive to determining the first image and determining the second image, using a processor to automatically generate a composite image using the first image and the second image.

2. The method of claim 1, wherein the document comprises a page of a larger document.

3. The method of claim 1, wherein the document comprises an area of a larger document.

4. The method of claim 1, wherein determining the first image comprises:
generating an undistorted image of the document; and
cropping the undistorted image.

5. The method of claim 4, wherein generating the undistorted image of the document comprises obtaining the undistorted image from a document repository.

6. The method of claim 4, wherein generating the undistorted image of the document comprises generating the undistorted image from an electronic document.

7. The method of claim 1, wherein determining the second image comprises obtaining the second image from a document repository.

8. The method of claim 1, wherein determining the second image comprises:
generating an undistorted image of the document; and
distorting the undistorted image.

9. The method of claim 1, further comprising modifying, responsive to the search query, one of the first image and the second image.

10. The method of claim 9, wherein modifying, responsive to the search query, one of the first image and the second image comprises one of underlining, outlining, and highlighting a search term in one of the first image and the second image.

11. The method of claim 1, wherein generating the composite image using the first image and the second image comprises generating a composite image of the first image overlaid on the second image.

12. The method of claim 11, wherein generating the composite image of the first image overlaid on the second image comprises outlining the first image.

13. The method of claim 11, wherein generating the composite image of the first image overlaid on the second image comprises modifying one of a font color and a background color of the first image.

14. The method of claim 1, wherein generating the composite image using the first image and the second image comprises generating an image, the image comprising the first image, the second image, and a callout indicating the first image and the second image.

15. A system for generating an image of a document, the system comprising:
a processor configured to perform a method, the method comprising:
determining a first image, the first image comprising a representation of a region of interest, the region of interest comprising a first portion of the document, the first portion being relevant to a search query;
determining a second image, the second image comprising a distorted representation of the document, the document comprising the first portion and a second portion that is not relevant to the search query; and
responsive to determining the first image and determining the second image, automatically generating a composite image using the first image and the second image.

16. The system of claim 15, wherein the document comprises a page of a larger document.

17. The system of claim 15, wherein the document comprises an area of a larger document.

18. The system of claim 15, wherein determining the first image comprises:
generating an undistorted image of the document; and
cropping the undistorted image.

19. The system of claim 18, wherein generating the undistorted image of the document comprises obtaining the undistorted image from a document repository.

20. The system of claim 18, wherein generating the undistorted image of the document comprises generating the undistorted image from an electronic document.

21. The system of claim 15, wherein determining the second image comprises obtaining the second image from a document repository.

22. The system of claim 15, wherein determining the second image comprises:
generating an undistorted image of the document; and
distorting the undistorted image.

23. The system of claim 15, wherein the method further comprises modifying, responsive to the search query, one of the first image and the second image.

24. The system of claim 23, wherein modifying, responsive to the search query, one of the first image and the second image comprises performing one of underlining, outlining, and highlighting a search term in one of the first image and the second image.

25. The system of claim 15, wherein generating the composite image using the first image and the second image comprises generating a composite image of the first image overlaid on the second image.

26. The system of claim 25, wherein generating the composite image of the first image overlaid on the second image comprises outlining the first image.

27. The system of claim 25, wherein generating the composite image of the first image overlaid on the second image comprises modifying one of a font color and a background color of the first image.

28. The system of claim 15, wherein generating the composite image using the first image and the second image comprises generating an image, the image comprising the first image, the second image, and a callout indicating the first image and the second image.

29. A computer readable medium containing a computer program product for generating an image of a document, the computer program product comprising program code for:
determining a first image, the first image comprising a representation of a region of interest, the region of interest comprising a first portion of the document, the first portion being relevant to a search query;
determining a second image, the second image comprising a distorted representation of the document, the document comprising the first portion and a second portion that is not relevant to the search query; and
responsive to determining the first image and determining the second image, automatically generating a composite image using the first image and the second image.

30. A computer-implemented method for generating an image of a document, the method comprising:
determining a first image, the first image comprising a representation of a region of interest, the region of interest comprising a first portion of the document, the first portion being relevant to a search query;
determining a second image, the second image comprising a representation of the document, wherein the representation of the document is more distorted than the representation of the region of interest, and wherein the document comprises the first portion and a second portion that is not relevant to the search query; and responsive to determining the first image and determining the second image, using a processor to automatically generate a composite image using the first image and the second image.

31. The method of claim 30, wherein the document comprises a page of a larger document.

32. The method of claim 30, wherein the document comprises an area of a larger document.

33. The method of claim 30, farther comprising modifying, responsive to the search query, one of the first image and the second image.

34. A computer-implemented method for generating an image of a document, the method comprising:

determining a first image, the first image comprising a representation of a region of interest, the region of interest comprising a first portion of the document, the first portion being relevant to a search query;

determining a second image, the second image comprising a distorted representation of the document, the document comprising the first portion and a second portion that is not relevant to the search query; and using a processor to generate a composite image comprising the first image overlaid onto the second image such that the first image obscures only a portion of the second image that corresponds to the region of interest.

35. The method of claim 34, wherein generating the composite image comprising the first image overlaid onto the second image comprises outlining the first image.

36. The method of claim 34, wherein generating the composite image comprising the first image overlaid onto the second image comprises modifying one of a font color and a background color of the first image.

37. The method of claim 34, wherein the document comprises a page of a larger document.

38. The method of claim 34, wherein the document comprises an area of a larger document.

39. The method of claim 34, further comprising modifying, responsive to the search query, one of the first image and the second image.

40. A computer-implemented method for generating an image of a document, the method comprising:

determining a first image, the first image comprising a representation of a region of interest, the region of interest comprising a first portion of the document, the first portion being relevant to a search query;

determining a second image, the second image comprising a representation of the document, wherein the representation of the document is more distorted than the representation of the region of interest, and wherein the document comprises the first portion and a second portion that is not relevant to the search query; and using a processor to generate a composite image comprising the first image overlaid onto the second image such that the first image obscures only a portion of the second image that corresponds to the region of interest.

41. The method of claim 40, wherein generating the composite image comprising the first image and the second image comprises generating a composite image of the first image overlaid on the second image.

42. The method of claim 40, wherein generating the composite image of the first image overlaid on the second image comprises outlining the first image.

43. The method of claim 40, wherein generating the composite image of the first image overlaid on the second image comprises modifying one of a font color and a background color of the first image.

44. The method of claim 40, wherein the document comprises a page of a larger document.

45. The method of claim 40, wherein the document comprises an area of a larger document.

46. The method of claim 40, further comprising modifying, responsive to the search query, one of the first image and the second image.

47. A computer-implemented method for generating an image of a document, the method comprising:

determining a first image, the first image comprising a representation of a region of interest, the region of interest comprising a first portion of the document, the first portion being relevant to a search query;

determining a second image, the second image comprising a distorted representation of the document, the document comprising the first portion and a second portion that is not relevant to the search query; and using a processor to generate a composite image comprising the first image and the second image arranged in such a way that the first image is proximate to the second image.

48. The method of claim 47, wherein the composite image further comprises a callout indicating the first image and the second image.

49. The method of claim 47, wherein the document comprises a page of a larger document.

50. The method of claim 47, wherein the document comprises an area of a larger document.

51. The method of claim 47, further comprising modifying, responsive to the search query, one of the first image and the second image.

52. A computer-implemented method for generating an image of a document, the method comprising:

determining a first image, the first image comprising a representation of a region of interest, the region of interest comprising a first portion of the document, the first portion being relevant to a search query;

determining a second image, the second image comprising a representation of the document, wherein the representation of the document is more distorted than the representation of the region of interest, and wherein the document comprises the first portion and a second portion that is not relevant to the search query; and using a processor to generate a composite image comprising the first image and the second image arranged in such a way that the first image is proximate to the second image.

53. The method of claim 52, wherein the composite image further comprises a callout indicating the first image and the second image.

54. The method of claim 52, wherein the document comprises a page of a larger document.

55. The method of claim 52, wherein the document comprises an area of a larger document.

56. The method of claim 52, further comprising modifying, responsive to the search query, one of the first image and the second image.

* * * * *

UNITED STATES PATENT AND TRADEMARK OFFICE
CERTIFICATE OF CORRECTION

| | | |
|---|---|---|
| PATENT NO. | : 7,561,755 B2 | Page 1 of 1 |
| APPLICATION NO. | : 10/948734 | |
| DATED | : July 14, 2009 | |
| INVENTOR(S) | : O'Sullivan | |

It is certified that error appears in the above-identified patent and that said Letters Patent is hereby corrected as shown below:

Column 10, Claim 1, Lines 60-61, please delete the phrase "less distorted".
Column 10, Claim 1, Line 65, please delete the word "more".
Column 13, Claim 33, Line 11, please delete the word "farther" and insert --further--.

Signed and Sealed this

Twenty-seventh Day of October, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,561,755 B2 | Page 1 of 1 |
| APPLICATION NO. | : 10/948734 | |
| DATED | : July 14, 2009 | |
| INVENTOR(S) | : O'Sullivan | |

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by 756 days Delete the phrase "by 756 days" and insert -- by 955 days --

Signed and Sealed this

Eighteenth Day of May, 2010

David J. Kappos
*Director of the United States Patent and Trademark Office*